(12) United States Patent
Tsuchiya et al.

(10) Patent No.: US 11,840,226 B1
(45) Date of Patent: Dec. 12, 2023

(54) TRAVEL CONTROL METHOD AND TRAVEL CONTROL DEVICE

(71) Applicants: Nissan Motor Co., Ltd., Yokohama (JP); RENAULT S.A.S., Boulogne-Billancourt (FR)

(72) Inventors: Chikao Tsuchiya, Kanagawa (JP); Shoichi Takei, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/036,208

(22) PCT Filed: Nov. 27, 2020

(86) PCT No.: PCT/IB2020/000979
§ 371 (c)(1),
(2) Date: May 10, 2023

(87) PCT Pub. No.: WO2022/112811
PCT Pub. Date: Jun. 2, 2022

(51) Int. Cl.
*B60W 30/12* (2020.01)
*B60W 60/00* (2020.01)

(52) U.S. Cl.
CPC .......... *B60W 30/12* (2013.01); *B60W 60/001* (2020.02); *B60W 2540/20* (2013.01); *B60W 2552/53* (2020.02)

(58) Field of Classification Search
CPC ............... B60W 30/12; B60W 60/001; B60W 2540/20; B60W 2552/53
See application file for complete search history.

(56) References Cited

U.S. PATENT DOCUMENTS

| | | | |
|---|---|---|---|
| 2014/0267415 A1* | 9/2014 | Tang | G08G 1/165 345/633 |
| 2020/0073396 A1* | 3/2020 | Shimizu | G05D 1/0219 |
| 2020/0207342 A1* | 7/2020 | Hsu | B60W 50/0097 |

(Continued)

FOREIGN PATENT DOCUMENTS

| | | |
|---|---|---|
| JP | 2010-271999 A | 12/2010 |
| JP | 2016-218539 A | 12/2016 |

(Continued)

*Primary Examiner* — Ian Jen
*Assistant Examiner* — Danielle M Jackson
(74) *Attorney, Agent, or Firm* — Global IP Counselors, LLP

(57) ABSTRACT

A travel control device carries out a travel control for a vehicle based on detected lane boundary lines. A first prescribed position, an absolute vehicle position and an absolute vehicle azimuth angle are stored while changing from a state where the lane boundary lines can be detected to a state where the lane boundary lines cannot be detected. A second prescribed position is stored while changing from a state in which the lane boundary lines cannot be detected to a state in which the lane boundary lines can be detected. The host vehicle is controlled to travel along a travel path connecting the first prescribed position and the second prescribed position where a current absolute position and a current absolute azimuth angle of the host vehicle do not deviate by a prescribed value or more from the stored absolute position and the stored absolute azimuth angle.

8 Claims, 9 Drawing Sheets

(56) References Cited

U.S. PATENT DOCUMENTS

| | | | |
|---|---|---|---|
| 2021/0164797 A1* | 6/2021 | Sun | G01C 21/3602 |
| 2021/0166421 A1* | 6/2021 | Sun | G06T 7/74 |
| 2021/0213930 A1* | 7/2021 | Sengupta | B60R 11/04 |
| 2021/0263162 A1* | 8/2021 | Villien | G01S 19/31 |
| 2022/0004193 A1* | 1/2022 | Tamaki | G05D 1/0274 |

FOREIGN PATENT DOCUMENTS

| | | |
|---|---|---|
| JP | 2016-224593 A | 12/2016 |
| JP | 2019-12308 A | 1/2019 |

\* cited by examiner

TRAVEL CONTROL METHOD AND TRAVEL CONTROL DEVICE

CROSS-REFERENCE TO RELATED APPLICATIONS

This application is a U.S. national stage application of International Application No. PCT/IB2020/000979, filed on Nov. 27, 2020.

BACKGROUND

Technical Field

The present disclosure relates to a travel control method and a travel control device.

Background Information

Japanese Laid-Open Patent Application No. 2016-224593 (Patent Document 1) discloses a road shape detection method for the accurate identification of the shape of a lane by combining vehicle travel information during autonomous driving with vehicle travel information during manual driving. This road shape detection method identifies the detected point (travel locus) of the current position of a vehicle over time during autonomous driving as the lane center line and identifies the lane boundaries based on the distribution of the distance between the identified lane center line and the detected points of the current position over time during manual driving.

SUMMARY

However, in the road shape detection method of the prior art described above, in order to execute autonomous driving assistance for vehicles, lane boundary lines and other vehicles in the vicinity, etc., are detected by camera, etc., and the travel locus of the vehicle during autonomous driving travel is identified as the lane center line. Therefore, in sections in which lane boundary lines are incompletely drawn, have disappeared or faded to the extent of being undetectable by camera, etc., it is difficult to identify lane center lines and lane boundaries accurately; thus, there is the risk that the host vehicle will be unable to travel in prescribed position within its own lane.

In view of the problem described above, an object of the present invention is to provide a travel control method and a travel control device with which it is possible for a vehicle to travel in a prescribed position within its own lane, even in sections where lane boundary lines cannot be detected.

The travel control method according to one aspect of the present invention detects lane boundary lines provided at the widthwise ends of the vehicle lane in which a host vehicle is traveling and carries out travel control of the host vehicle based on the detection result of the lane boundary lines. A first prescribed position with respect to the lane boundary lines is calculated and stored when the vehicle goes from a state in which the lane boundary lines can be detected to a state in which the lane boundary lines cannot be detected, and a second prescribed position with respect to the lane boundary lines is calculated and stored when the vehicle goes from a state in which the lane boundary lines cannot be detected to a state in which the lane boundary lines can be detected. The host vehicle is then controlled to travel along a travel path connecting the first prescribed position and the second prescribed position during travel in a section for which the first and second prescribed positions are stored.

By means of the present invention, it is possible to travel in a prescribed position within the host vehicle lane even in sections in which lane boundary lines cannot be detected.

BRIEF DESCRIPTION OF THE DRAWINGS

Referring now to the attached drawings which form a part of this original disclosure.

FIG. 6B is a diagram illustrating an example of a travel scenario according to the illustrated embodiment of.

DETAILED DESCRIPTION

Figure 1:
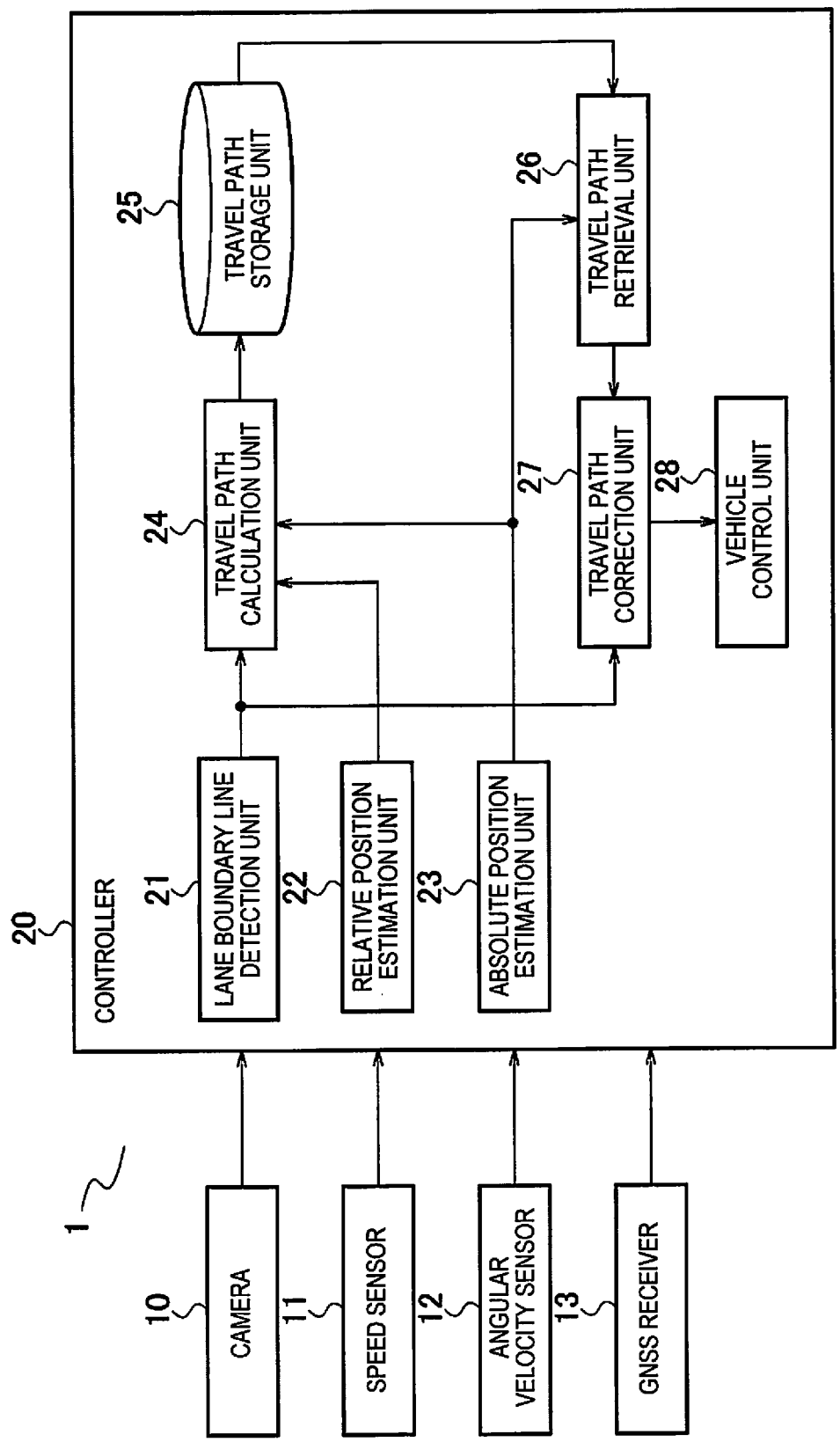
FIG. 1 is a block diagram showing an example of the configuration of the travel control device according to an illustrated embodiment.

Embodiments of the present invention will be described below with reference to the drawings. In the descriptions of the figures, identical parts have been assigned the same reference numerals, and their descriptions have been omitted.

Configuration Example of the Travel Control Device

An example of the configuration of a travel control device that executes the travel control method according to the present embodiment will be described with reference to FIG. 1. As shown in FIG. 1, the travel control device 1 comprises a camera 10, a speed sensor 11, an angular velocity sensor 12, a GNSS receiver 13, and a controller 20. The travel control device 1 according to this embodiment is mounted in a vehicle V and controls the travel of vehicle V.

The travel control device 1 may be mounted in a vehicle that has an autonomous driving function or a vehicle that does not have an autonomous driving function. The travel control device 1 may also be mounted in a vehicle capable of switching between autonomous driving and manual driving. Autonomous driving in this embodiment refers to a state in which, for example, at least one actuator, such as the brake, accelerator, steering, is controlled without any operation from the occupant. Therefore, other actuators may be operated by an operation from the occupant. Autonomous driving may also be any state in which any control, such as acceleration/deceleration control, lateral position control, etc., is being executed. Further, manual driving in this embodiment refers to a state in which the occupant is operating the brake, accelerator, or steering wheel, for example.

The camera 10 is mounted on vehicle V and photographs the surroundings of vehicle V. The camera 10 comprises an imaging element, such as a CCD (charge-coupled device), CMOS (complementary metal oxide semiconductor), and the like. The camera 10 sequentially outputs the captured images to the controller 20.

The speed sensor 11 detects the travel speed (vehicle speed) of vehicle V. The speed sensor 11 includes, for example, a sensor rotor that rotates together with a wheel and that has a protrusion (gear pulser) formed on the circumference thereof and a detection circuit having a pickup coil provided to face the protrusion of the sensor rotor. The speed sensor 11 converts the change in the magnetic flux density accompanying the rotation of the sensor rotor into a voltage signal by means of the pickup coil and measures the wheel speed of each wheel from the voltage signal. The speed sensor 11 computes the average wheel speed of each wheel as the vehicle speed. The speed sensor 11 outputs the detected vehicle speed of vehicle V to the controller 20.

The angular velocity sensor 12 detects angular velocity of vehicle V and outputs the detected angular velocity to the controller 20.

The GNSS receiver 13 is a GPS receiver or the like, which detects the position of vehicle V on the ground (hereafter may be referred to as self-location) by receiving radio waves from a plurality of satellites. The GNSS receiver 13 outputs the detected position information of vehicle V to the controller 20. "GNSS" is an acronym for "Global Navigation Satellite System" and "GPS" is an acronym for "Global Positioning System."

The controller 20 is a general-purpose microcomputer with a CPU (central processing device), memory, and an input/output unit. A computer program is installed in the microcomputer to make it function as the travel control device 1. By executing the computer program, the microcomputer functions as a plurality of information processing circuits provided in the travel control device 1. Although the plurality of information processing circuits provided in the travel control device 1 are realized in software in the example shown here, it is of course possible to configure the plurality of information processing circuits as dedicated hardware, in order to execute each of the following information processes. The plurality of information processing circuits may also be realized in discrete hardware. The controller 20 includes the following as the plurality of information processing circuits: a lane boundary line detection unit 21, a relative position estimation unit 22, an absolute position estimation unit 23, a travel path calculation unit 24, a travel path storage unit 25, a travel path retrieval unit 26, a travel path correction unit 27, and a vehicle control unit 28.

From images captured by the camera 10, the lane boundary line detection unit 21 detects lane boundary lines ahead of the vehicle, which are provided at the widthwise ends of the host vehicle lane in which vehicle V is traveling. Lane boundary lines are division lines that delineate a roadway, such as the white lines on the road surface, raised pavement markers, or curbs. The lane boundary line detection unit 21 detects the relative positions of vehicle V and the detected lane boundary line. The relative position detected by the lane boundary line detection unit 21 is a position in a vehicle coordinate system. The vehicle coordinate system may be set, for example, such that the center of the rear axle of vehicle V is the origin, the forward direction is the positive direction of the x axis, and the left direction is the positive direction of the y axis. Further, a formula for converting from the coordinate system of the camera 10 to the coordinate system of the vehicle is set in advance in the lane boundary line detection unit 21.

The relative position estimation unit 22 acquires the vehicle speed of vehicle V from the speed sensor 11 and the angular velocity of vehicle V from the angular velocity sensor 12. The relative position estimation unit 22 estimates the relative position and attitude (azimuth angle) of vehicle V in a relative coordinate system with a certain position as the origin by so-called odometry, in which the distance and direction of movement of the vehicle V is calculated from the acquired vehicle speed and angular velocity. For example, when the travel control device 1 is activated or when the process is reset, the relative position and the relative azimuth angle of vehicle V are estimated with the position of vehicle V as the origin and the azimuth angle of vehicle V set to 0°. The relative position estimation unit 22 may estimate the relative position and the relative azimuth angle of vehicle V by odometry using the steering angle and rpm of the wheels, or estimate the relative position and relative azimuth angle of vehicle V by odometry using the steering and rotation speed of the wheels. Thus, the parameters used for odometry are not particularly limited.

The absolute position estimation unit 23 acquires the self-location of vehicle V from the GNSS receiver 13, the vehicle speed of vehicle V from the speed sensor 11, and the angular velocity of vehicle V from the angular velocity sensor 12. The absolute position estimation unit 23 estimates the absolute position of the vehicle V from the acquired self-location, vehicle speed, and angular velocity of vehicle V using a Kalman filter. The self-location acquired from the GNSS receiver 13 contains errors due to the presence of obstacles, etc. By combining the self-location acquired from the GNSS receiver 13 with the vehicle speed and angular velocity, the absolute position estimation unit 23 can suppress the effect of errors in the self-location.

The travel path calculation unit 24 calculates and stores a prescribed position relative to a lane boundary line detected by vehicle V at a first point as the first prescribed position. A prescribed position relative to a lane boundary line detected at a second point after vehicle V has traveled for a prescribed interval from the first point is then calculated and stored as the second prescribed position. The travel path calculation unit 24 calculates and stores, for example, the center positions of the lane boundary lines detected at the first and second points as the first and second prescribed positions. For example, the travel path calculation unit 24 calculates and stores the first and second prescribed positions during manual driving travel of vehicle V. The travel path calculation unit 24 calculates and stores the direction along the host vehicle lane at the first prescribed position and the direction along the host vehicle lane at the second prescribed position.

The travel path calculation unit 24 checks the operating state of the turn indicator of vehicle V while vehicle V travels in the section from the first prescribed position to the second prescribed position. In the case that the turn indicator of vehicle V is not activated while vehicle V travels in the section from the first prescribed position to the second prescribed position, the travel path calculation unit 24 calculates a travel path connecting the stored first and second prescribed positions. The travel path calculation unit 24 calculates a travel path that connects the first and second prescribed positions such that the orientation thereof matches the direction along the host vehicle lane at the first prescribed position and/or the direction along the host vehicle lane at the second prescribed position.

In the case that the turn indicator of vehicle V is activated while the vehicle V travels in the segment from the first prescribed position to the second prescribed position, the travel path calculation unit 24 determines whether a deviation of a prescribed value or more exists between the azimuth angles of vehicle V at the first and second points or between the first and second prescribed positions. If a deviation of a prescribed value or more exists between the azimuth angles of vehicle V at the first and second points or between the first and second prescribed positions, a travel path connecting the first and second prescribed positions is then calculated. If a deviation of the prescribed value or more does not exist between the azimuth angles of vehicle V at the first and second points or between the first and second prescribed positions, a travel path is not calculated. Details of the travel path calculation method of the travel path calculation unit 24 will be described further below with reference to FIGS. 2-4.

The travel path storage unit 25 stores in memory in the controller 20, as a set, the absolute position and the absolute azimuth angle of vehicle V at the first point, the positions of the lane boundary lines detected by vehicle V at the first point, and the first and second prescribed positions and the travel paths calculated by the travel path calculation unit 24.

During travel in a section for which the first and second prescribed positions are stored, the travel path retrieval unit 26 retrieves the travel path closest to the current absolute position of vehicle V within a prescribed range from the current absolute position of vehicle V from the travel paths stored in the travel path storage unit 25. For example, during autonomous driving travel of the vehicle V, the travel path retrieval unit 26 retrieves the travel path closest to the current absolute position of vehicle V within a prescribed range from the current absolute position of the vehicle V from the travel paths stored in the travel path storage unit 25. Details of the travel path retrieval method of the travel path retrieval unit 26 will be described further below with reference to FIG. 5.

If the current position and the current azimuth angle of vehicle V do not deviate by a prescribed value or more from the position and the azimuth angle of vehicle V at the first point, which are stored as a set with the travel path retrieved by the travel path retrieval unit 26, the travel path correction unit 27 corrects the travel path retrieved by the travel path retrieval unit 26. Based on the difference between the respective positions of the lane boundary lines stored as a set with the travel path retrieved by the travel path retrieval unit 26 and the positions of the lane boundary lines detected by the current vehicle V, the travel path correction unit 27 corrects the travel path retrieved by the travel path retrieval unit 26 to a relative travel path with respect to the current vehicle V. The corrected travel path is then set as the travel path of the current vehicle V. Details of the travel path correction method of the travel path correction unit 27 will be described further below with reference to FIG. 5.

The vehicle control unit 28 controls the actuators of vehicle V such that vehicle V follows the travel path corrected by the travel path correction unit 27. The actuators include brake actuators, accelerator pedal actuators, steering actuators, etc.

Travel Path Calculation Method

An example of the travel path calculation method of the travel path calculation unit 24 will be described with reference to FIGS. 2-4.

Figure 2:
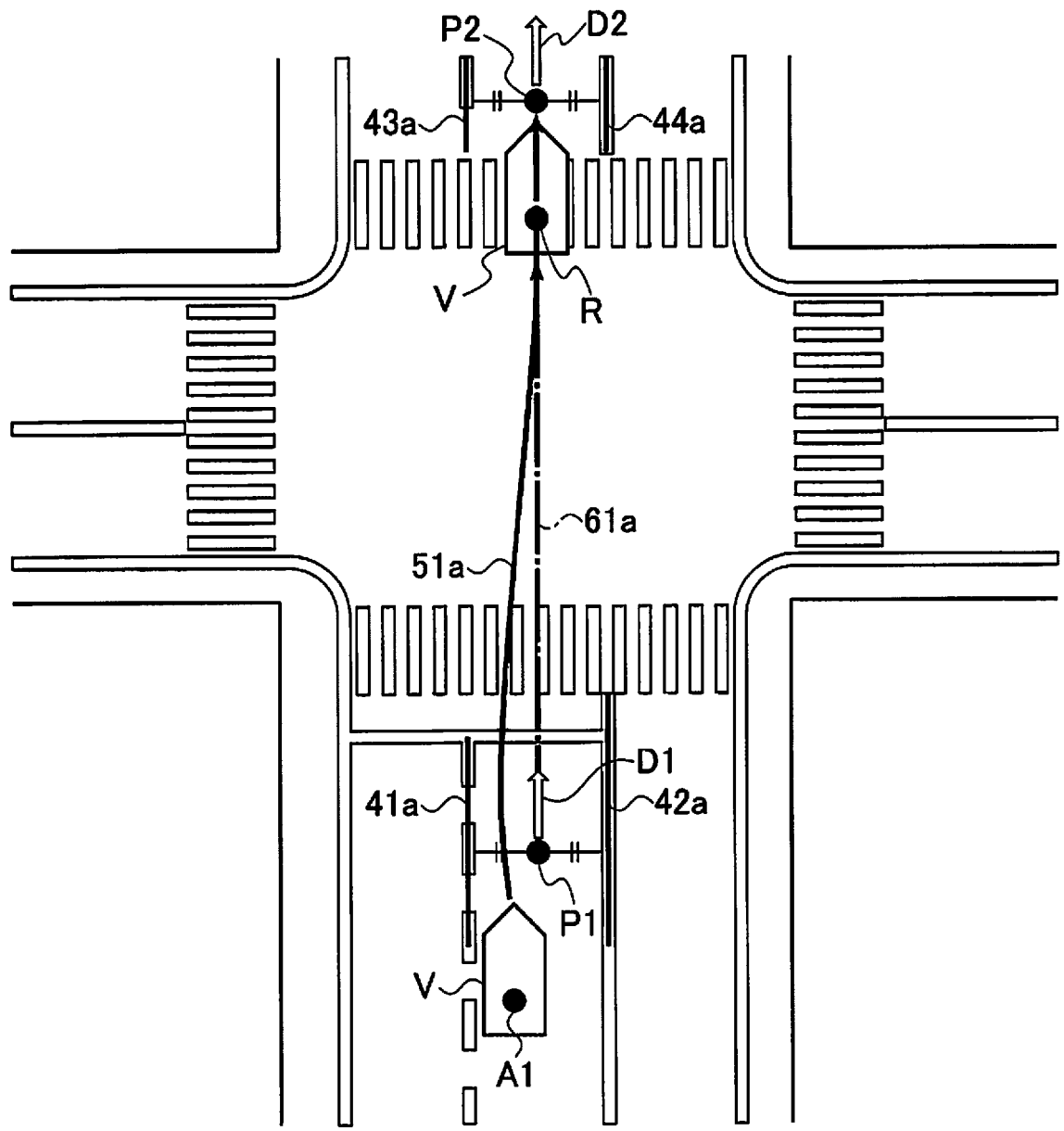
FIG. 2 is a diagram illustrating an example of the travel path calculation method according to the illustrated embodiment.

FIG. 2 shows a scenario in which vehicle V passes through an intersection during manual driving travel. The travel path calculation unit 24 acquires the positions of lane boundary lines 41a, 42a detected by vehicle V in front of the intersection (first point). The travel path calculation unit 24 calculates the center position of the lane boundary lines 41a, 42a and stores this position as a first prescribed position P1. Since lane boundary lines are not present within the intersection shown in FIG. 2, when vehicle V enters the intersection, vehicle V cannot detect lane boundary lines while traveling along a travel locus 51a. When vehicle V then passes through the intersection, vehicle V will again be able to detect lane boundary lines. The travel path calculation unit 24 acquires the positions of lane boundary lines 43a, 44a detected at the point (second point) at which vehicle V has passed through the intersection. The center position of the lane boundary lines 43a, 44a is then calculated and stored as a second prescribed position P2. The travel path calculation unit 24 calculates and stores a direction D1 along the host vehicle lane at first prescribed position P1 and a direction D2 along the host vehicle lane at second prescribed position P2.

In the scenario shown in FIG. 2, the travel path calculation unit 24 determines that the turn indicator of vehicle V has not been activated as vehicle V travels in the section from first prescribed position P1 to second prescribed position P2. A travel path 61a that connects first prescribed position P1 and second prescribed position P2 is then calculated such that its orientation matches direction D1 along the host vehicle lane at first prescribed position PI and/or the direction along the host vehicle lane at second prescribed position P2.

The travel path storage unit 25 stores in memory in the controller 20 the absolute position A1 and the azimuth angle of vehicle V at the first point, the positions of the lane boundary lines 41a, 42a, first and second prescribed positions P1, P2, and the travel path 61a as a set.

Figure 3:
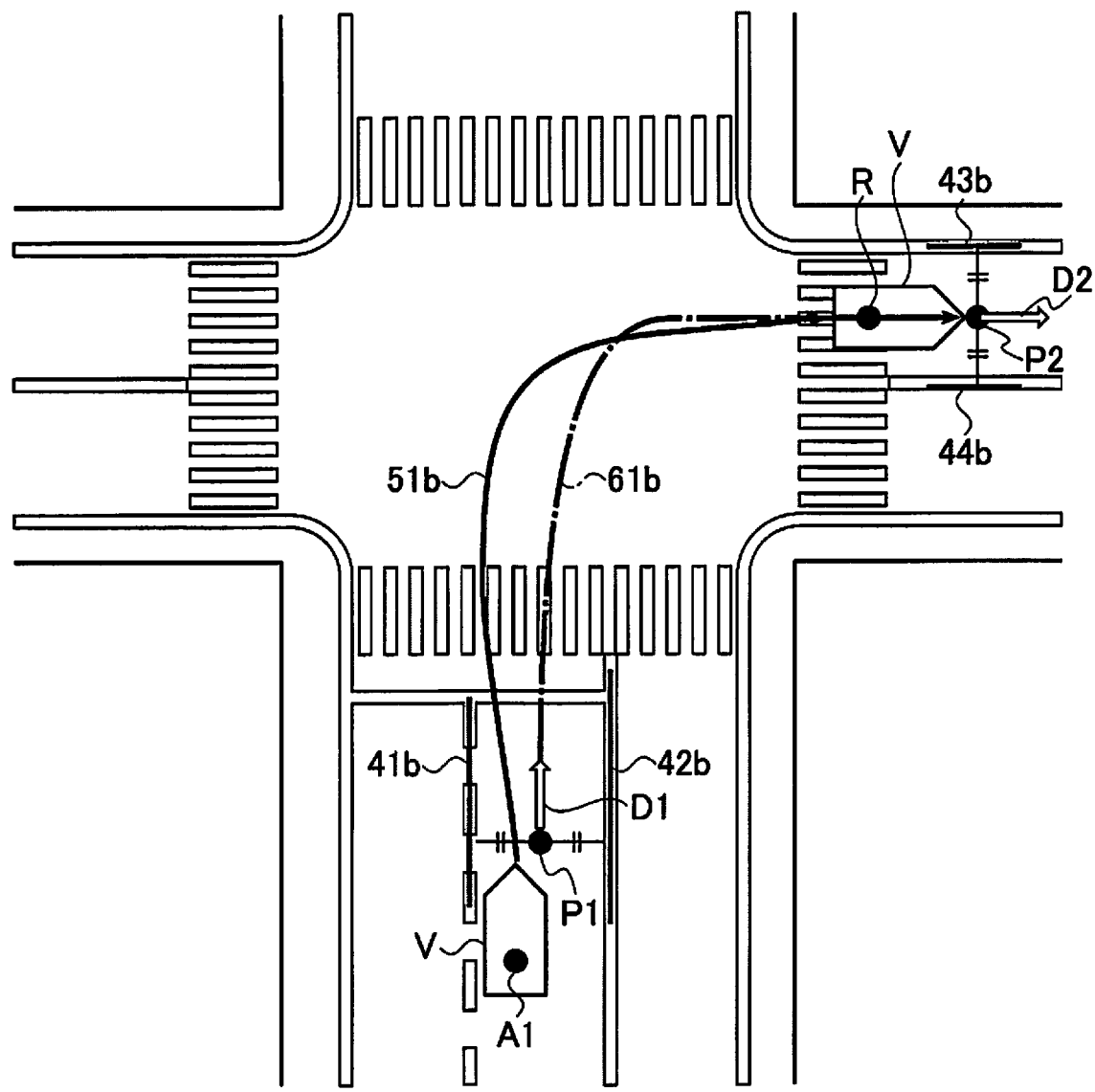
FIG. 3 is a diagram illustrating an example of the travel path calculation method according to the illustrated embodiment.

FIG. 3 shows a scenario in which vehicle V makes a right turn at an intersection during manual driving travel. The travel path calculation unit 24 acquires the positions of lane boundary lines 41b, 42b detected by vehicle V in front of the intersection (first point). The travel path calculation unit 24 calculates the center position of the lane boundary lines 41b, 42b and stores this position as a first prescribed position P1. When vehicle V then enters the intersection, vehicle V cannot detect lane boundary lines while traveling along a travel locus 51b to turn right at the intersection. When vehicle V then turns right at the intersection, vehicle V will again be able to detect lane boundary lines. The travel path calculation unit 24 acquires the positions of lane boundary lines 43b, 44b detected at the point (second point) at which vehicle V passed through the intersection. The center position of the lane boundary lines 43b, 44b is then calculated and stored as a second prescribed position P2. The travel path calculation unit 24 calculates and stores a direction D1 along the host vehicle lane at the first prescribed position and a direction D2 along the host vehicle lane at the second prescribed position.

In the scenario shown in FIG. 3, the travel path calculation unit 24 determines that the turn indicator of vehicle V has been activated as vehicle V travels in the section from first prescribed position P1 to second prescribed position P2. The travel path calculation unit 24 then determines that a deviation of a prescribed value or more exists between the azimuth angles of vehicle V at the first and second points or between the first and second prescribed positions P1, P2. A smooth curve that connects first and second prescribed positions P1, P2, such that its orientation matches direction D1 along the host vehicle lane at first prescribed position P1 and/or direction D2 along the host vehicle lane at second prescribed position P2, is then calculated as a travel path 61b. The travel path calculation unit 24 calculates the travel path 61b using a clothoid curve or a spline curve, for example.

The travel path storage unit 25 stores in memory in the controller 20 the absolute position A1 and azimuth angle of vehicle V at the first point, the positions of the lane boundary lines 41b, 42b, first and second prescribed positions P1, P2, and the travel path 61b as a set.

Figure 4:
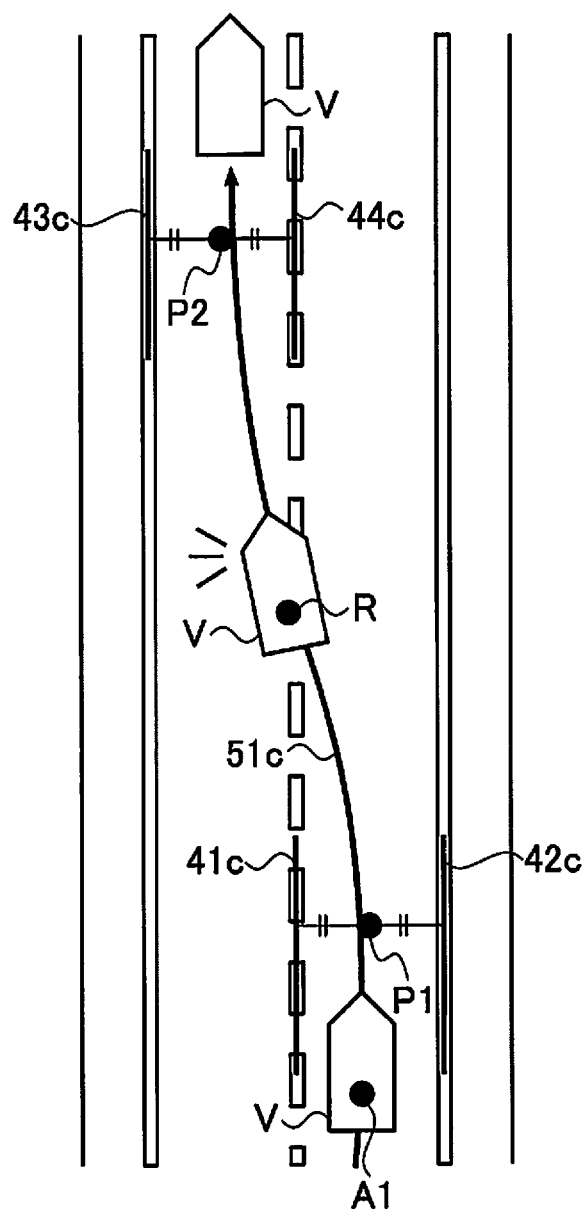
FIG. 4 is a diagram illustrating an example of the travel path calculation method according to the illustrated embodiment.

FIG. 4 shows a scenario in which vehicle V changes lanes during manual driving travel. The travel path calculation unit 24 acquires the positions of lane boundary lines 41c, 42c detected by vehicle V at a point (first point) before changing lanes. The travel path calculation unit 24 calculates the center position of the lane boundary lines 41c, 42c and stores this position as a first prescribed position P1. The positions of lane boundary lines 43c, 44c detected at a point (second point) after vehicle V travels along a travel locus 51c and starts to change lanes are then acquired. The center position of the lane boundary lines 43c, 44c is then calculated and stored as a second prescribed position P2. The travel path calculation unit 24 calculates and stores a direction D1 along the host vehicle lane at first prescribed position P1 and a direction D2 along the host vehicle lane at second prescribed position P2.

In the scenario shown in FIG. 4, the travel path calculation unit 24 determines that the turn indicator of vehicle V has been activated as vehicle V travels in the section from first prescribed position P1 to second prescribed position P2. The travel path calculation unit 24 then determines that a deviation of a prescribed value or more does not exist between the azimuth angles of vehicle V at the first and second points or between the first and second prescribed positions P1, P2. In this case, the travel path calculation unit 24 ends the process without calculating a travel path.

The first and second prescribed positions P1, P2 and the travel paths 61a, 61b are described as in terms of their relative positions in a relative coordinate system, with the absolute position A1 of vehicle V when vehicle V is at the first point as the origin. When vehicle V is at the first point, the absolute position estimation unit 23 estimates the absolute position A1 of vehicle V. Then, when vehicle V is at the second point, the relative position estimation unit 22 estimates a relative position R of vehicle V, with the absolute position A1 as the origin. The travel path calculation unit 24 calculates first and second prescribed positions P1, P2 as well as the relative positions of the travel paths 61a, 61b based on the absolute position A1 and relative position R. Although cases in which vehicle V passes directly through an intersection, in which vehicle V turns right at an intersection, and in which vehicle V changes lanes were used as examples, the travel path calculation method can also be applied to cases in which vehicle V turns left at an intersection, or travels on a straight road or a curve, and is not limited to these cases.

Travel Path Retrieval Method and Travel Path Correction Method

Next, an example of the travel path retrieval method of the travel path retrieval unit 26 and the travel path correction method of the travel path correction unit 27 will be explained with reference to FIG. 5.

Figure 5:
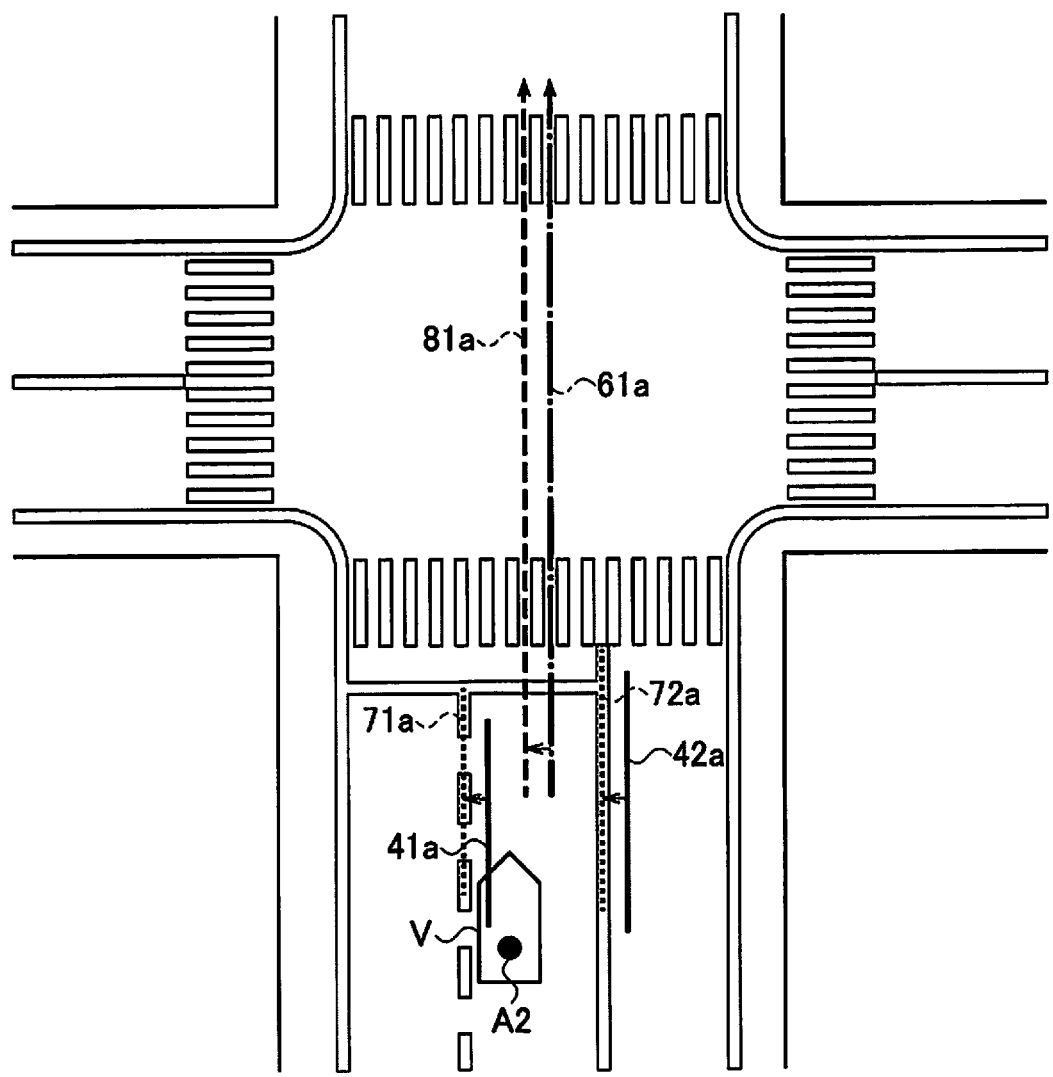
FIG. 5 is a diagram illustrating an example of the travel path correction method according to the illustrated embodiment.

FIG. 5 shows a scenario in which vehicle V is again about to traverse the intersection shown in FIG. 2 through which it has previously traveled. The travel path retrieval unit 26 retrieves the travel path closest to the current absolute position A2 of vehicle V within a prescribed range from the current absolute position A2 of vehicle V from the travel paths stored in the travel path storage unit 25. The travel path retrieval unit 26 extracts the travel path 61a closest to the current absolute position A2 of vehicle V within a prescribed range from the current absolute position A2 of vehicle V. The absolute position A1 and the azimuth angle of vehicle V and the positions of the lane boundary lines 41a, 42a stored as a set with the travel path 61a are then extracted.

The travel path correction unit 27 determines whether the current absolute position A2 and azimuth angle of vehicle V deviate by a prescribed value or more from the absolute position A1 and the azimuth angle of vehicle V extracted by the travel path retrieval unit 26. In the scenario of FIG. 5, the travel path correction unit 27 determines that the current absolute position A2 and azimuth angle of vehicle V do not deviate by a prescribed value or more from the absolute position A1 and the azimuth angle of vehicle V extracted by the travel path retrieval unit 26. The travel path correction unit 27 then obtains the positions of lane boundary lines 71a, 72a detected by the current vehicle V at the absolute position A2. The positions of the lane boundary lines 41a, 42a extracted by the travel path retrieval unit 26 are then associated with the positions of the lane boundary lines 71a, 72a. A coordinate transformation (translation/rotation) T is then calculated so that the positions of the lane boundary lines 41a, 42a coincide as much as possible with the positions of the lane boundary lines 71a, 72a.

The travel path correction unit 27 applies the calculated coordinate transformation T to the travel path 61a and corrects the position of the travel path 61a to a relative travel path 81a with respect to the current vehicle V. The corrected travel path is then set as the travel path of the current vehicle V. In this manner, by correcting the position of the travel path based on a clear target, such as lane boundary lines, deviations in the travel path due to GNSS positioning errors can be suppressed. Although a case in which vehicle V passes directly through an intersection was described as an example, the travel path retrieval method and the travel path correction method can also be applied to cases in which vehicle V turns right or left at an intersection, or travels on a straight road or a curve, and are not limited to this case.

Figure 6A:
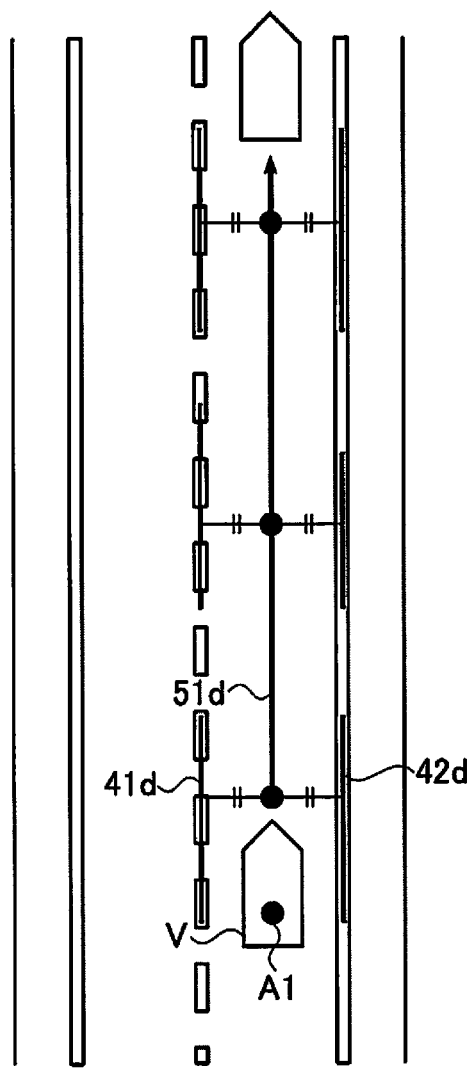
FIG. 6A is a diagram illustrating an example of a travel scenario according to the illustrated embodiment.
Figure 6B:
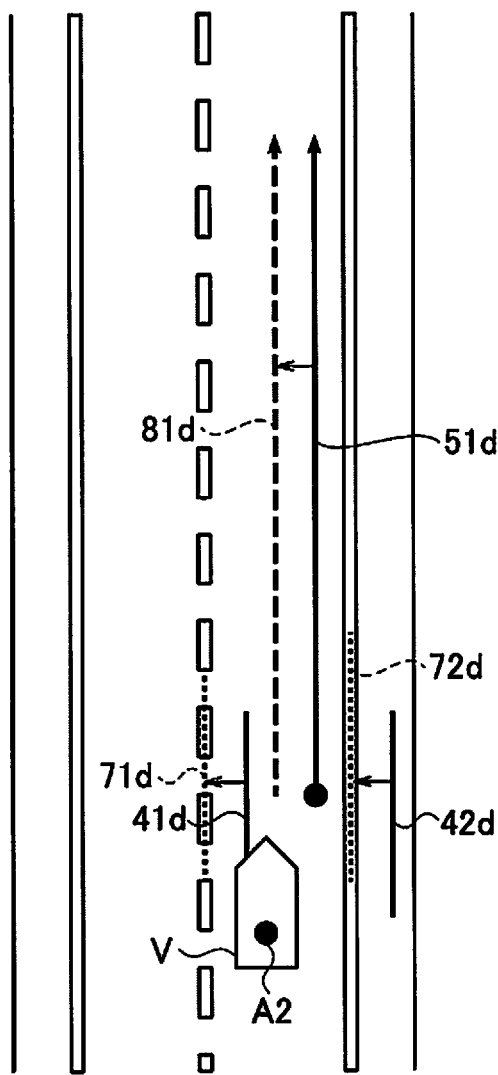

In the case that vehicle V is traveling on a travel path connecting the prescribed positions of the detected lane boundary lines in a section in which the lane boundary lines of the host vehicle lane can be continuously detected, the controller 20 may store the travel route of vehicle V instead of a travel path connecting the first and second prescribed positions. That is, the position with respect to the lane boundary lines 41d, 42d at the first and second prescribed positions may be set as the relative position of vehicle V with respect to the lane boundary lines 41d, 42d during manual driving instead of the center position of the lane. For example, as shown in FIG. 6, if vehicle V is traveling in the host vehicle lane along a travel path connecting the center positions of the lane boundary lines continuously detected by vehicle V, the travel path storage unit 25 stores in memory in the controller 20 the absolute position A1 and azimuth angle of vehicle V at the first point, the positions of the lane boundary lines 41d, 42d detected by vehicle V at the first point, and the travel locus 51d as a set. In this case, as shown in FIG. 6B, based on the difference between the positions of the lane boundary lines 41d, 42d stored as a set with the travel locus 51*d* extracted by the travel path retrieval unit 26 and the positions of the lane boundary lines 71*d*, 72*d* detected by the current vehicle V, respectively, the travel path correction unit 27 corrects the travel locus 51*d* extracted by the travel path retrieval unit 26 to a relative travel path 81*d* with respect to the current vehicle V. The corrected travel path 81*d* is then set as the travel path of the current vehicle V.

An example of the flow of operations of the travel control device according to this embodiment of the present invention will now be described with reference to the flowcharts of FIGS. 7 and 8.

Figure 7:
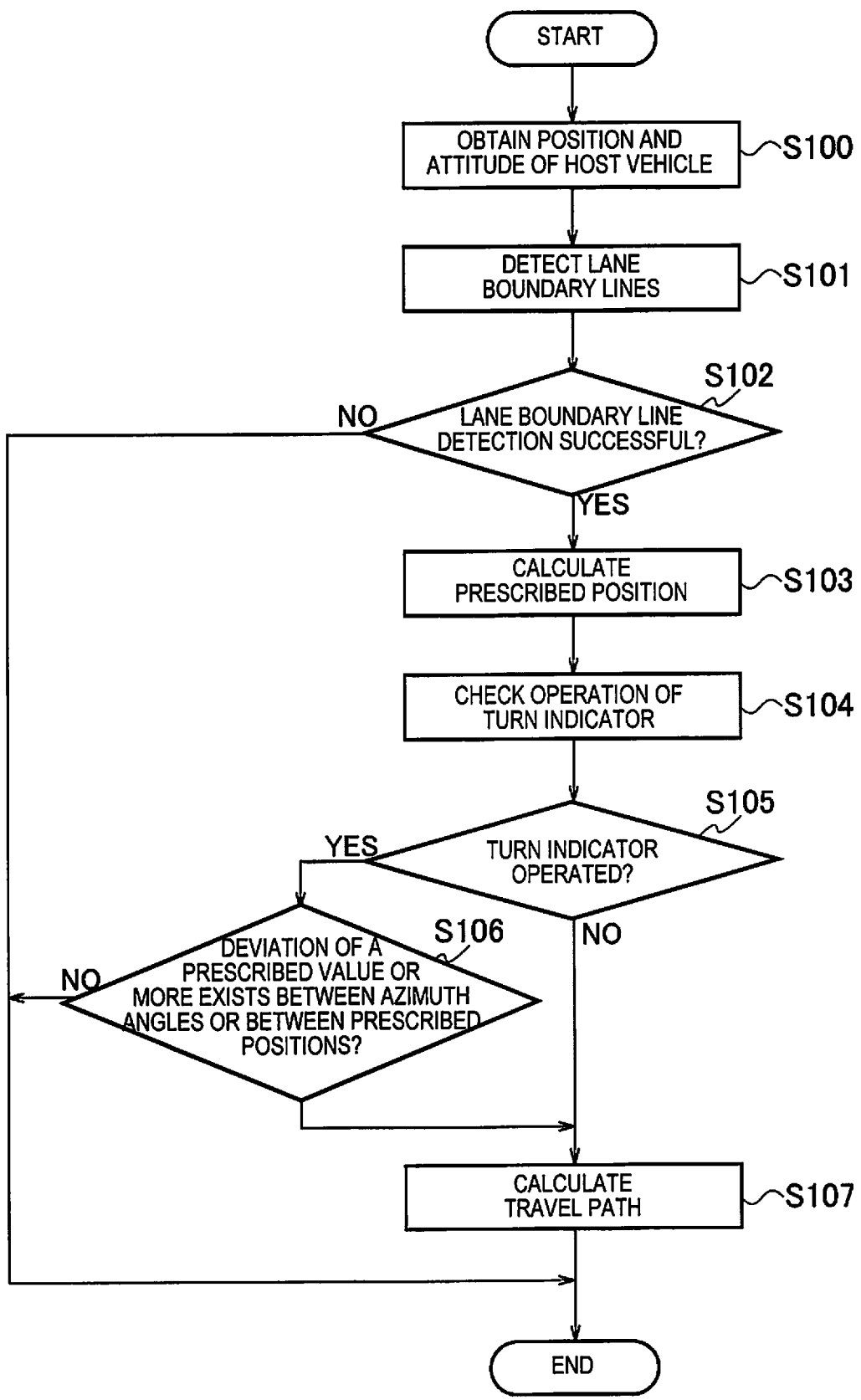
FIG. 7 is a flowchart illustrating an example of an operation of the travel control device according to the illustrated embodiment.

FIG. 7 shows an example of the flow of operations of the travel control device 1 during manual driving travel of vehicle V. In Step S100 of FIG. 7, the absolute position estimation unit 23 estimates the absolute position of vehicle V on a map based on the self-location of vehicle V acquired from the GNSS receiver 13 as well as the vehicle speed and angular velocity. The relative position estimation unit 22 estimates the relative position and the relative azimuth angle of vehicle V in a relative coordinate system, with the absolute position of vehicle V estimated by the absolute position estimation unit 23 as the origin.

In Step S101, the lane boundary line detection unit 21 detects, from images captured by the camera 10, lane boundary lines in front of the vehicle provided at the widthwise ends of the host vehicle lane in which vehicle V is traveling. In Step S102, the lane boundary line detection unit 21 determines whether the lane boundary lines have been successively detected. If lane boundary lines have been successively detected (YES in Step S102), the process proceeds to Step S103. On the other hand, if the lane boundary lines have not been detected (NO in Step S102), the process of FIG. 7 is terminated.

In Step S103, the travel path calculation unit 24 calculates and stores a prescribed position with respect to the lane boundary lines detected by the lane boundary line detection unit 21. The travel path calculation unit 24 calculates and stores the direction along the host vehicle lane at the calculated prescribed position.

In Step S104, the travel path calculation unit 24 checks the operating state of the turn indicator of vehicle V as vehicle V travels in the section from the previously stored prescribed position (first prescribed position) to the currently stored prescribed position (second prescribed position). In Step S105, if the turn indicator of vehicle V has been activated as vehicle V travels in the section from the first prescribed position to the second prescribed position (YES in Step S105), the process proceeds to Step S106. On the other hand, if the turn indicator of vehicle V has not been activated as vehicle V travels in the section from the first prescribed position to the second prescribed position (NO in Step S105), the process proceeds to Step S107.

In Step S106, the travel path calculation unit 24 determines whether a deviation of a prescribed value or more exists between the azimuth angles of vehicle V at the first and second points or between the first and second prescribed positions. If a deviation of a prescribed value or more exists between the azimuth angles of vehicle V at the first and second points or between the first and second prescribed positions (YES in Step S106), the process proceeds to Step S107. If a deviation of the prescribed value or more does not exist between the azimuth angles of vehicle V at the first and second points or between the first and second prescribed positions (NO in Step S106), the process of FIG. 7 is terminated.

In Step S107, the travel path calculation unit 24 calculates a travel path connecting the stored first and second prescribed positions. Here, a case is considered in which the state changes from one in which the lane boundary lines can be detected, to one in which the lane boundary lines can no longer be detected, and then to one in which the lane boundary lines can again be detected. In such a case, the point at which the state changes from one in which the lane boundary lines can be detected to a state in which lane dividing lines cannot be detected is the first point, and the prescribed position relative to the lane boundary lines at this first point is the first prescribed position. Further, the point at which the state changes from one in which the lane boundary lines cannot be detected to a state in which the lane boundary lines can be detected is the second point, and the prescribed position relative to the lane boundary lines at this second point is the second prescribed position. In the present embodiment, the point at which the state changes from one in which lane boundary lines are detectable to a state in which lane boundary lines are not detectable is the first point, and the point at which the state changes from one in which the lane boundary lines are not detectable to a state in which the lane boundary lines are detectable is the second point, but no limitation is implied thereby. For example, the first point may be the point at a prescribed time before the time at which the state changes from one in which the lane boundary lines are detectable to a state in which the lane boundary lines are undetectable. Similarly, the second point may be the point at a prescribed time after the time at which the state changes from one in which the lane boundary lines are undetectable to a state in which the lane boundary lines are detectable. The travel path calculation unit 24 calculates a travel path connecting the first and second prescribed positions such that its orientation matches the direction along the host vehicle lane at the first prescribed position and/or the direction along the host vehicle lane at the second prescribed position. The travel path storage unit 25 stores in memory in the controller 20 the absolute position and the azimuth angle of vehicle V at the first point, the positions of the lane boundary lines detected by vehicle V at the first point, and the first and second prescribed positions and the travel path calculated by the travel path calculation unit 24 as a set.

Figure 8:
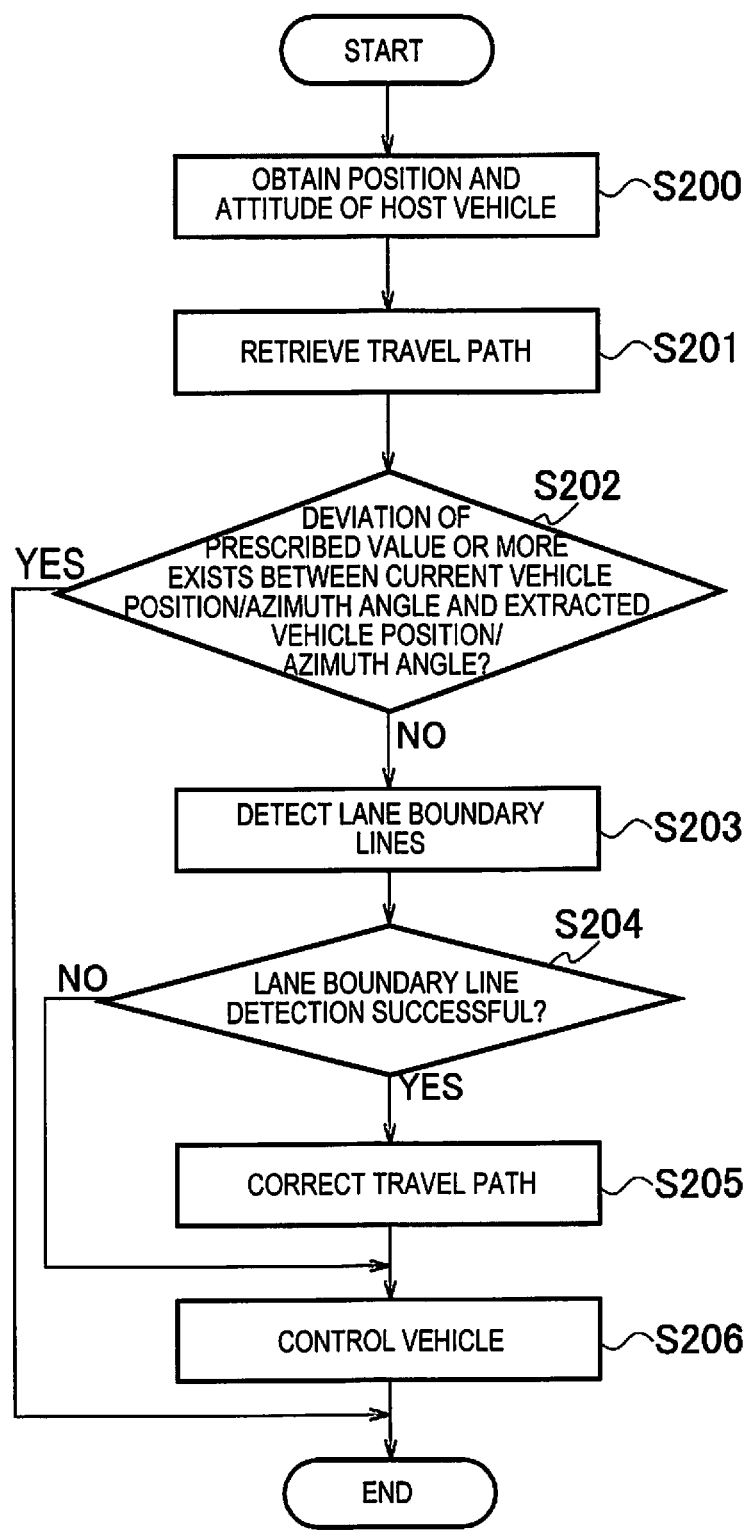
FIG. 8 is a flowchart illustrating an example of an operation of the travel control device according to the illustrated embodiment.

FIG. 8 shows an example of the flow of operations of the travel control device 1 during autonomous driving travel of vehicle V. In Step S200 of FIG. 8, the absolute position estimation unit 23 estimates the absolute position of vehicle V on a map based on the self-location of vehicle V acquired from the GNSS receiver 13 and the vehicle speed and angular velocity. The relative position estimation unit 22 estimates the relative position and the relative azimuth angle of vehicle V in a relative coordinate system, with the absolute position of vehicle V estimated by the absolute position estimation unit 23 as the origin.

In Step S201, the travel path retrieval unit 26 extracts the travel path closest to the current absolute position of vehicle V within a prescribed range from the current absolute position of vehicle V from the absolute positions stored in the travel path storage unit 25. The absolute position and the absolute azimuth angle of vehicle V and the positions of the lane boundary lines stored as a set with the retrieved travel path are then extracted.

The process proceeds to Step S202, and the travel path correction unit 27 determines whether the current absolute position and the current azimuth angle of vehicle V deviate by a prescribed value or more from the absolute position and the absolute azimuth angle of vehicle V extracted by the travel path retrieval unit 26. If the current absolute position and the current absolute azimuth angle of vehicle V deviated by the prescribed value or more from the absolute position and the azimuth angle of vehicle V extracted by the travel path retrieval unit 26 (YES in Step S202), then the travel path calculation unit 24 terminates the process of FIG. 8. On the other hand, if the current absolute position and the current absolute azimuth angle of vehicle V do not deviate by a prescribed value or more from the absolute position and the absolute azimuth angle of vehicle V extracted by the travel path retrieval unit 26 (NO in Step S202), the process proceeds to Step S203.

In Step S203, the lane boundary line detection unit 21 detects, from images captured by the camera 10, lane boundary lines in front of the vehicle provided at the widthwise ends of the host vehicle lane in which vehicle V is traveling. Proceeding to Step S204, the lane boundary line detection unit 21 determines whether the lane boundary lines have been successfully detected. If the lane boundary lines have been successfully detected (YES in Step S204), the process proceeds to Step S205. If the lane boundary lines have not been detected (NO in Step S204), the process proceeds to Step S206.

In Step S205, the travel path correction unit 27 associates the positions of the lane boundary lines retrieved by the travel path retrieval unit 26 in Step S201 with the positions of the lane boundary lines detected by the lane boundary line detection unit 21 in Step S203. A coordinate transformation (translation/rotation) T is then calculated so that the positions of the lane boundary lines retrieved by the travel path retrieval unit 26 in Step S201 match the positions of the lane boundary lines detected by the lane boundary line detection unit 21 in Step S203 to the extent possible. The travel path correction unit 27 applies the calculated coordinate transformation T to the travel path retrieved by the travel path calculation unit 24 in Step S201 so that it is corrected to a relative travel path with respect to the current vehicle V. The corrected travel path is then set as the travel path of current vehicle V.

In Step S206, the vehicle control unit 28 controls the actuators of vehicle V such that vehicle V follows the travel path corrected by the travel path correction unit 27, and the process of FIG. 8 is terminated.

In the present embodiment, it was described that when vehicle V is traveling in a section for which first and second prescribed positions are stored, based on the difference between the respective positions of the lane boundary lines detected by vehicle V at the first point and the positions of the lane boundary lines detected by the current vehicle V, the travel path connecting the first and second prescribed positions is corrected to a relative travel path with respect to the current vehicle V. However, a first target present in the vicinity of the host vehicle at a first point may be detected and stored, and when vehicle V travels in a section for which first and second prescribed positions are stored, a second target corresponding to the first target may be detected and stored, and the travel path may be corrected based on the positional deviation between the first and second targets.

In this case, the travel path storage unit 25 stores in memory in the controller 20 the absolute position and the absolute azimuth angle of vehicle V at the first point, the positions of the first target detected at the first point, and the first and second prescribed positions and the travel path calculated by the travel path calculation unit 24 as a set. Then, based on the difference between the position of the first target stored as a set with the travel path extracted by the travel path retrieval unit 26 and the position of the second target corresponding to the first target detected by the current vehicle V, the travel path correction unit 27 corrects the travel path extracted by the travel path retrieval unit 26 to a relative travel path with respect to the current vehicle V. The first and second targets may be any one of lane boundary lines, stop lines, traffic lights, road signs, road markings, or a combination thereof.

As described above, the travel control device according to the present invention comprises a controller that detects lane boundary lines provided at the widthwise ends of a host vehicle lane in which a host vehicle is traveling and performs travel control of the host vehicle based on the detection result of the lane boundary lines. A first prescribed position with respect to the lane boundary lines is calculated and stored when changing from a state in which the lane boundary lines can be detected to a state in which the lane boundary lines cannot be detected, and a second prescribed position with respect to the lane boundary lines is calculated and stored when changing from a state in which the lane boundary lines cannot be detected to a state in which the lane boundary lines can be detected. The host vehicle is then controlled to travel along a travel path connecting the first prescribed position and the second prescribed position during travel in a section for which the first and second prescribed positions are stored.

Therefore, it is possible to set a travel path that connects a first prescribed position with respect to the lane boundary lines when changing from a state in which the lane boundary lines can be detected to a state in which the lane boundary lines cannot be detected, and a second prescribed position when going from a state in which the lane boundary lines cannot be detected to a state in which the lane boundary lines can be detected. During travel in a section for which the first and second prescribed positions are stored, this allows travel in a prescribed position in the lane even in a section such as an intersection in which lane boundary lines cannot be detected.

The travel control device according to the present invention calculates the lane widthwise center position of the host vehicle lane as the first and second prescribed positions with respect to the lane boundary lines. Thus, it is possible to set a travel path that connects the lane widthwise center positions of the host vehicle lane at the time when the lane boundary lines could be detected. During travel in a section for which the first and second prescribed positions are stored, this allows travel in the center position of the lane, even in sections such as intersections in which lane boundary lines cannot be detected.

The travel control device according to the present invention calculates and stores the direction along the host vehicle lane at the first and second prescribed positions, and calculates a travel path that connects the first and second prescribed positions such that its orientation matches the direction along the host vehicle lane at the first prescribed position and/or the direction along the host vehicle lane at the second prescribed position. It is thus possible to set a travel path whose orientation matches the orientation of the host vehicle at the first prescribed position and the direction of the host vehicle lane at the second prescribed position. Even in a case in which the orientation of the host vehicle lane at the first prescribed position and the orientation of the host vehicle lane at the second prescribed position significantly differ, such as when the host vehicle turns left or right, or travels along a curve, it is possible to travel in the prescribed position of the lane.

The travel control device according to the present invention detects and stores a first target present in the vicinity of the host vehicle when the first prescribed position is calculated and stored, and detects a second target corresponding to the first target during travel in a section for which first and second prescribed positions are stored, and corrects the travel path based on the positional deviation between the first target and the second target. Therefore, it is possible to calculate the positional deviation between the first target detected when the first prescribed position was calculated and the second target corresponding to the second target detected during travel in a section for which first and second prescribed positions are stored. It is thus possible to correct the errors in the positions of locators when the first and second prescribed positions are calculated and the positions of locators during travel in a section for which first and second prescribed positions are stored, and to suppress errors in the positions of the travel path connecting the first and second prescribed positions.

Moreover, the first and second targets may be any one of lane boundary lines, stop lines, traffic lights, road signs, road markings, or a combination thereof. It is thus possible to select one or a more detectable targets from among targets present in the vicinity of the vehicle. It is thus also possible to more accurately correct the errors in the position of the host vehicle when the first prescribed position is calculated, and the position of the host vehicle during travel in a section for which first and second prescribed positions are stored, and to suppress errors in the positions of the travel path connecting the first and second prescribed positions.

If the turn indicator of the host vehicle is activated as the host vehicle travels in the section from the first prescribed position to the second prescribed position, the travel control device according to the present invention calculates the travel path if a deviation of a prescribed value or more exists between the first and second prescribed positions, or between the attitudes of the host vehicle when the first and second prescribed positions were calculated, and does not calculate a travel path if a deviation of a prescribed value or more does not exist. Therefore, in the case that there is a deviation between the first and second prescribed positions, such as when the host vehicle turns right or left, or travels along a curve, or a case in which the attitudes of the host vehicle are respectively different when the first and second prescribed positions are calculated, a travel path connecting the first and second prescribed positions is calculated. Then, if the first and second prescribed positions do not diverge, such as when the host vehicle changes lanes, or when the attitude of the host vehicle does not deviate at between he first and second prescribed positions when these positions are calculated, a travel path connecting the first and second prescribed positions is not calculated. As a result, when the turn indicator is activated, it is possible to set separate travel paths for host vehicle right/left turns and host vehicle lane changes, thereby preventing the setting of an unsuitable travel path.

During travel in a section for which the first and second prescribed positions are stored, if the position and attitude of the host vehicle deviate by a prescribed value or more from the position and attitude of the host vehicle when the first prescribed position is calculated and stored the travel control device according to the present invention does not set the calculated travel path as the travel path of the host vehicle. Therefore, if the host vehicle is traveling in a state in which the host vehicle deviates significantly from its own lane, a travel path is not set, and thus the setting of an unsuitable travel path can be prevented.

The invention claimed is:

1. A travel control method for a vehicle equipped with a controller that detects lane boundary lines provided at widthwise ends of a host vehicle lane in which a host vehicle is traveling and that carries out a travel control of the host vehicle based on a detection result of the lane boundary lines, the travel control method comprising:
   calculating and storing a first prescribed position with respect to the lane boundary lines, and storing an absolute position and an absolute azimuth angle of the host vehicle during a change from a state in which the lane boundary lines can be detected to a state in which the lane boundary lines cannot be detected;
   calculating and storing a second prescribed position with respect to the lane boundary lines during a change from a state in which the lane boundary lines cannot be detected to a state in which the lane boundary lines can be detected; and
   controlling the host vehicle to travel along a travel path connecting the first prescribed position and the second prescribed position where a current absolute position and a current absolute azimuth angle of the host vehicle do not deviate by a prescribed value or more from the absolute position and the absolute azimuth angle of the host vehicle stored when the first prescribed position was calculated and stored during travel in a section for which the first and second prescribed positions are stored.

2. The travel control method according to claim 1, wherein
   a widthwise center position of the host vehicle lane is calculated as the first and second prescribed positions with respect to the lane boundary lines.

3. The travel control method according to claim 1, further comprising
   calculating and storing a direction of the host vehicle lane at each of the first and second prescribed positions, and
   calculating the travel path that connects the first prescribed position and the second prescribed position such that an orientation of the travel path matches the direction of the host vehicle lane at one or both of the first prescribed position and the second prescribed position.

4. The travel control method according to claim 3, wherein
   when a turn indicator of the host vehicle is operated while the host vehicle travels in a section from the first prescribed position to the second prescribed position,
   the travel path is calculated when a deviation of a prescribed value or more exists between the first and second prescribed positions or between attitudes of the host vehicle when the first and second prescribed positions were calculated and stored, and
   the travel path is not calculated when a deviation of the prescribed value or more does not exist.

5. The travel control method according to claim 3, wherein
   the calculated travel path is not set as the travel path of the host vehicle where the current absolute position and the current azimuth angle of the host vehicle deviate by a prescribed value or more from the absolute position and the azimuth angle of the host vehicle when the first prescribed position was calculated and stored during travel in a section for which the first and second prescribed positions are stored.

6. The travel control method according to claim 1, further comprising
   detecting and storing a first target present in a vicinity of the host vehicle where the first prescribed position is calculated and stored,
   storing a second target corresponding to the first target during travel in a section for which the first and second prescribed positions are stored, and
   correcting the travel path based on a positional deviation between the first target and the second target.

7. The travel control method according to claim 6, wherein
   the first and second targets are any one of lane boundary lines, stop lines, traffic lights, road signs, road markings, or a combination thereof.

8. A travel control device for a vehicle the travel control device comprising:
   a controller that detects lane boundary lines provided at widthwise ends of a host vehicle lane in which a host vehicle is traveling and that carries out a travel control of the host vehicle based on a detection result of the lane boundary lines, wherein
   the controller is configured to
   calculate and store a first prescribed position with respect to the lane boundary lines and store an absolute position and an absolute azimuth angle of the host vehicle during a change from a state in which the lane boundary lines can be detected to a state in which the lane boundary lines cannot be detected,
   calculate and store a second prescribed position with respect to the lane boundary lines during a change from a state in which the lane boundary lines cannot be detected to a state in which the lane boundary lines can be detected, and
   control the host vehicle to travel along a travel path connecting the first prescribed position and the second prescribed position where a current absolute position and a current absolute azimuth angle of the host vehicle do not deviate by a prescribed value or more from the absolute position and the absolute azimuth angle of the host vehicle stored when the first prescribed position was calculated and stored during travel in a section for which the first and second prescribed positions have been stored.

* * * * *